(12) United States Patent
Miranda (10) Patent No.: US 11,187,208 B2
(45) Date of Patent: Nov. 30, 2021

(54) PERFORMANCE MONITORING OF A MULTI-ROTOR WIND TURBINE SYSTEM

(71) Applicant: VESTAS WIND SYSTEMS A/S, Aarhus N (DK)

(72) Inventor: Erik Carl Lehnskov Miranda, Randers SV (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 134 days.

(21) Appl. No.: 16/488,845

(22) PCT Filed: Feb. 28, 2018

(86) PCT No.: PCT/DK2018/050037
§ 371 (c)(1),
(2) Date: Aug. 26, 2019

(87) PCT Pub. No.: WO2018/157896
PCT Pub. Date: Sep. 7, 2018

(65) Prior Publication Data
US 2021/0108617 A1    Apr. 15, 2021

(30) Foreign Application Priority Data

Mar. 1, 2017    (DK) .......................... PA 2017 70150

(51) Int. Cl.
*F03D 17/00*    (2016.01)
*F03D 9/25*    (2016.01)
(Continued)

(52) U.S. Cl.
CPC ............... *F03D 17/00* (2016.05); *F03D 1/02* (2013.01); *F03D 7/0224* (2013.01); *F03D 9/25* (2016.05);
(Continued)

(58) Field of Classification Search
CPC . F03D 1/02; F03D 7/0224; F03D 9/25; F03D 17/00; F05B 2220/706;
(Continued)

(56) References Cited

U.S. PATENT DOCUMENTS 4,435,647 A    3/1984  Harner et al.
5,876,181 A *  3/1999  Shin ....................... F03D 15/10
                                                          415/2.1
(Continued)

FOREIGN PATENT DOCUMENTS

CN        101627207 A    1/2010
CN        203756432 U    8/2014
(Continued)

OTHER PUBLICATIONS

PCT Written Opinion of the International Searching Authority for Application No. PCT/DK2018/050037 dated Aug. 30, 2017.
(Continued)

*Primary Examiner* — Pedro J Cuevas
(74) *Attorney, Agent, or Firm* — Patterson + Sheridan, LLP (57) ABSTRACT

The invention relates to a method for monitoring performance of a multi-rotor wind turbine. According to the method parameter for each of the wind turbine modules of the multi-rotor wind turbine is obtained. The parameters of each of the wind turbine modules are compared, e.g. by means of a comparison parameter determined from the individual parameters. Dependent on the result of the comparison, a performance action is initiated, e.g. for the purpose of further characterization or verification of a deviating parameter determined via the comparison.

20 Claims, 5 Drawing Sheets

(51) Int. Cl.
*F03D 1/02* (2006.01)
*F03D 7/02* (2006.01)

(52) U.S. Cl.
CPC ..... *F05B 2220/706* (2013.01); *F05B 2240/37* (2020.08); *F05B 2260/83* (2013.01); *F05B 2270/32* (2013.01); *F05B 2270/327* (2013.01); *F05B 2270/328* (2013.01); *F05B 2270/331* (2013.01)

(58) Field of Classification Search
CPC ............ F05B 2240/37; F05B 2270/327; F05B 2270/328; F05B 2270/331
USPC ...................................................... 290/44, 55
See application file for complete search history.

(56) References Cited

U.S. PATENT DOCUMENTS

| | | | | |
|---|---|---|---|---|
| 6,641,367 | B1* | 11/2003 | Klippe | F03D 13/20 416/99 |
| 6,749,399 | B2 | 6/2004 | Heronemus | F03D 13/20 416/41 |
| 7,075,189 | B2* | 7/2006 | Heronemus | F03D 9/255 290/44 |
| 7,296,974 | B2* | 11/2007 | Wobben | F03D 13/25 416/132 B |
| 9,013,053 | B2* | 4/2015 | Lee | F03D 13/20 290/55 |
| 10,138,866 | B2* | 11/2018 | Ohya | H02K 7/1838 |
| 10,273,939 | B2* | 4/2019 | Baun | F03D 7/0224 |
| 10,465,658 | B2* | 11/2019 | Oshetski | F03D 7/0224 |
| 10,570,880 | B2* | 2/2020 | Baun | F03D 7/0268 |
| 10,648,454 | B2* | 5/2020 | Miranda | F03D 1/02 |
| 10,690,116 | B2* | 6/2020 | Grunnet | F03D 7/0296 |
| 10,697,424 | B2* | 6/2020 | Andersen | F03D 1/02 |
| 10,697,436 | B2* | 6/2020 | Baun | E04H 12/24 |
| 10,711,764 | B2* | 7/2020 | Baun | F03D 7/0264 |
| 10,753,338 | B2* | 8/2020 | Miranda | F03D 7/047 |
| 10,808,682 | B2* | 10/2020 | Miranda | F03D 1/02 |
| 2003/0168864 | A1* | 9/2003 | Heronemus | F03D 13/25 290/55 |
| 2003/0170123 | A1* | 9/2003 | Heronemus | F03D 13/20 416/41 |
| 2005/0218656 | A1* | 10/2005 | Wobben | F03D 13/20 290/55 |
| 2009/0196748 | A1* | 8/2009 | Salter | F03D 80/50 416/120 |
| 2013/0127173 | A1* | 5/2013 | Lee | F03D 13/20 290/55 |
| 2016/0356266 | A1 | 12/2016 | Koerber et al. | |
| 2018/0017042 | A1* | 1/2018 | Baun | H02P 9/04 |
| 2018/0023543 | A1* | 1/2018 | Kudsk | F16H 7/02 416/9 |
| 2018/0100488 | A1* | 4/2018 | Miranda | F03D 7/045 |
| 2018/0180022 | A1* | 6/2018 | Baun | F03D 7/0264 |
| 2018/0283355 | A1* | 10/2018 | Miranda | F03D 7/047 |
| 2018/0347544 | A1* | 12/2018 | Net | F03D 1/02 |
| 2018/0355850 | A1* | 12/2018 | Baun | F03D 13/20 |
| 2019/0003457 | A1* | 1/2019 | Miranda | F03D 7/0264 |
| 2019/0048854 | A1* | 2/2019 | Oshetski | F03D 7/0224 |
| 2019/0093630 | A1* | 3/2019 | Net | F03D 7/0296 |
| 2020/0408194 | A1* | 12/2020 | Zen | G01W 1/02 |
| 2021/0071639 | A1* | 3/2021 | Warfen | F03D 7/047 |

FOREIGN PATENT DOCUMENTS

| | | |
|---|---|---|
| EP | 2225461 A1 | 9/2010 |
| WO | 2010020450 A1 | 2/2010 |
| WO | 2016128002 A1 | 8/2016 |
| WO | 2016128003 A1 | 8/2016 |
| WO | 2016128004 A1 | 8/2016 |
| WO | 2016128005 A1 | 8/2016 |
| WO | 2016150447 A1 | 9/2016 |
| WO | 2018157896 A1 | 9/2018 |

OTHER PUBLICATIONS

Danish Patent and Trademark Office First Technical Examination for Application No. PA 2017 70150 dated Aug. 30, 2017.
PCT International Search Report for Application No. PCT/DK2018/050037 dated May 22, 2018.
Chinese Office Action for Application No. 201880019735.5 dated Apr. 28, 2020.

* cited by examiner

PERFORMANCE MONITORING OF A MULTI-ROTOR WIND TURBINE SYSTEM

FIELD OF THE INVENTION

The present invention relates to a wind turbine system with multiple rotors, particularly to a method for monitoring performance of such wind turbine systems.

BACKGROUND OF THE INVENTION

In order to create further improvements in the development of wind turbines, a new wind turbine system has been developed. The new wind turbine system includes a plurality of wind turbine modules or nacelles and, therefore, a plurality of rotors. The wind turbine modules can be mounted on a support structure which is carried by a single tower.

In order to ensure stable and economic operation of the wind turbine system monitoring systems for monitoring operation of the wind turbine system is required. Such monitoring systems are capable of monitoring performance parameters of wind turbines, e.g. for the purpose of detecting faults or other performance issues. Monitoring systems have been developed for traditional single-rotor wind turbines, but may not be optimal or suitable for monitoring multi-rotor wind turbines.

Accordingly, there is a need for new monitoring systems which are suited for multi-rotor wind turbines.

SUMMARY OF THE INVENTION

It is an object of the invention to improve multi-rotor wind turbines, particularly to improve monitoring systems capable of monitoring performance of multi-rotor wind turbines.

In a first aspect of the invention there is provided a method for monitoring performance of a wind turbine system which comprises a plurality of wind turbine modules mounted to a common support structure, where each of the wind turbine modules comprises a rotor, a power generation system driven by the rotor, and a rotor blade pitch adjustment system for pitching rotor blades, the method comprises:
  obtaining a parameter for each of the turbine modules, where each parameter relates to the operation of the wind turbine module for which the parameter is obtained,
  determining a comparison parameter based on at least one of the parameters,
  comparing the parameter for one of the wind turbine modules with a comparison parameter, and
  invoking a performance action dependent on a result of the comparison.

Since the wind turbine system comprises a plurality of wind turbine modules which are located in the vicinity of each other, each of the wind turbine modules are exposed to similar environmental conditions such as similar temperatures and wind speed. Accordingly, each of the wind turbine modules can be expected to have similar performances and, therefore, it can also be expected that parameters for each of the turbine modules are similar. Accordingly, if the parameter of one of the wind turbine modules deviates significantly from the parameter of another wind turbine module or a comparison parameter, this could indicate a problem with one of the wind turbine modules. Depending on the comparison and the type of parameters, a subsequent action could be initiated to further investigate the cause of the deviation. Accordingly, the presence of more wind turbine modules in the same wind turbine system can advantageously be exploited for detection of irregularities. The same would normally not be possible for traditional wind turbines due to the larger distance between neighbor wind turbines.

The determination of the comparison parameter based on at least one of the parameters may comprise determining the comparison parameter based on all parameters determined for all wind turbine modules, or a selection of a part of all parameters such as a selection which excludes the parameter currently compared with the comparison parameter. Alternatively, the comparison parameter may be identical to one of the parameters for the purpose of comparing each one of the parameters with each other parameter.

According to an embodiment, determining a comparison parameter comprises determining the comparison parameter based on all parameters determined for all wind turbine modules.

According to an embodiment, determining a comparison parameter comprises determining the comparison parameter based on a part of all parameters, such as wherein said part of all parameters does not include all parameters.

According to an embodiment, determining a comparison parameter comprises determining the comparison parameter based on a part of all parameters, which (part of all parameters) excludes the one parameter being compared with the comparison parameter. For example a parameter is obtained for a wind turbine module and said parameter is compared with a comparison parameter being based on one or more other parameters obtained for one or more other wind turbine modules.

According to an embodiment, determining a comparison parameter comprises determining the comparison parameter based on at least one parameter, which at least one parameter is different from the one parameter being compared with the comparison parameter. For example a parameter is obtained for a wind turbine module and said parameter is compared with a comparison parameter being based on one or more parameters obtained for one or more wind turbine modules, wherein at least one of the one or more parameters obtained for one or more wind turbine modules is a another parameter (such as a parameter obtained for another wind turbine module) than the parameter being compared with the comparison parameter. A possible advantage of this may be that it ensures comparison between one parameter obtained for one wind turbine module and a comparison parameter which is based on at least one other parameter from at least one other wind turbine module. An advantage of this may in turn be, that it enables comparing parameters obtained from different wind turbine modules, which may reveal relevant differences between the wind turbine modules.

According to an embodiment, determining a comparison parameter based on at least one of the parameters comprises determining the comparison parameter as a function, such as a mathematical function, of at least one of the parameters. According to an embodiment, a value of the comparison parameter depends on a value of at least one of the parameters, such as the value of the comparison parameter is subject to change upon change of the value of the at least on of the parameters (upon which the comparison parameter is based).

According to an embodiment, the step of obtaining the parameter for each of the wind turbine modules comprises determining the parameter dependent on a wind speed for the respective wind turbine module so as to compensate the parameters of the wind turbine modules mounted at different heights for a dependency on different wind speeds at the different heights. Advantageously, by determining the parameters on basis of wind speeds, e.g. as a function of wind speed, where the wind speeds are valid for the wind turbine for which the parameter is determined, the parameters may be compensated for the presence of different wind speeds at different heights, e.g. due to wind shear. In this way, a parameter for a first wind turbine module located at a first height becomes comparable with a parameter for a second wind turbine module located at a second height.

The parameters may be determined dependent on a history of values obtained over a period, e.g. values of pitch, power, acceleration of the wind turbine modules or other operational values of the wind turbine system, possibly together with values of wind speed for the wind turbine modules. For example, the parameters may be obtained based on statistics of the history of values. The history of values could be obtained over a period of several hours or several days.

According to an embodiment, each parameter is determined dependent on a power production of the wind turbine module for which the parameter is obtained. Advantageously, by determining the parameters so that they reflect the power production, a wind turbine module having a problem with the power production may be detected through comparison of such power parameters.

If a problem with power production is detected, a performance action may be invoked which comprises obtaining wind speeds used for controlling the wind turbine modules mounted at the same or substantially the same height. A low power production may be caused by incorrect pitch settings which are determined dependent on wind speed. Accordingly, if the obtained wind speeds for wind turbine modules at the same height are too different, there may be a problem e.g. with a wind speed signal. Thus, the obtained wind speeds may be used for detecting faults or problems with the wind speed signal.

According to an embodiment, e.g. in connection with detected power performance problems, the performance action may comprise obtaining pitch positions of the blades of at least two of the wind turbine modules. For example, the obtained pitch positions may be compared, e.g. for wind turbine modules at the same height. Particularly, the pitch positions at high wind speeds, e.g. in the full load range, may be compared since inefficient blades will cause operation with lower pitch angles at high wind speeds. Thus, the obtained pitch positions may be used for detecting blades which are inefficient due to damages, wear or other reasons.

According to an embodiment, each parameter is determined dependent on a pitch activity of the blades of the wind turbine module for which the parameter is obtained. Advantageously, detection of a high pitch activity for one of the wind turbine modules may enable correction of the cause of the high pitch activity and, thereby, reduce the risk for early blade bearing damages.

According to an embodiment, e.g. in connection with detected deviating pitch activity, the performance action may comprise performing a pitch test for at least two of the wind turbine modules, where the pitch test comprises determining a difference between an applied pitch reference and a measured pitch position of the blades for each of the at least two of the wind turbine modules. Advantageously, the pitch test may be used to detect problems with the pitch system performance, e.g. due to wear that prevents the pitch system to move properly. For example, the pitch test may comprise applying in-phase oscillating pitch references, such as sinusoidal references, to at least two of the wind turbine modules mounted at the same or substantially the same height.

According to an embodiment, each parameter is determined dependent on an acceleration of the wind turbine module for which the parameter is obtained.

Advantageously, detection of deviating acceleration values, e.g. high acceleration values, of one or more of the wind turbine modules may be used for detecting associated problems, e.g. mass imbalance on the rotor, blade pitch misalignments or other problems which could cause instability.

According other embodiments, each parameter is determined dependent on a blade load of the blades of the wind turbine module for which the parameter is obtained, or dependent on a generator speed of the wind turbine module for which the parameter is obtained. Advantageously, a combination of different parameters may be monitored in order to detect performance deviations between the wind turbine modules.

According to an embodiment each parameter is determined dependent on a number of alarms generated by the wind turbine module for which the parameter is obtained. The cause of a deviating number of alarms such as a high number of alarms may be due to mal-functioning sensor systems, e.g. due to a wrongly adjusted or misplaced sensor, due to beginning wear-out on one or more of the blade bearings generating pitch deviation alarms or due to other performance issues.

According to an embodiment, the method comprises obtaining a time-varying signal relating to the operation of the wind turbine for each of the turbine modules, and obtaining the parameter for each of the wind turbine modules based on its respective time-varying signal contained within a time-window containing the most recent part of the time-varying signal. Advantageously, the expected similar performance of the wind turbine modules may be used for detecting performance deviations by comparing parameters determined based on run-time signals. The comparison may be based on the most recent values of the time-varying signal, e.g. the most recent values contained within a time-window of at most one hour. Typically, the comparison may be based on recent values within a time-window of less than e.g. 10 minutes. Advantageously, the use of the time varying signal may enable fast detection of faults.

A second aspect of the invention relates to a monitoring system for monitoring performance of a wind turbine system, where the monitoring system is arranged to perform the steps according to the method of the first aspect.

A third aspect relates to a wind turbine system comprising:
    a plurality of wind turbine modules mounted to a common support structure, where each of the wind turbine modules comprises a rotor, a power generation system driven by the rotor, and a rotor blade pitch adjustment system for pitching rotor blades, and
    the monitoring system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
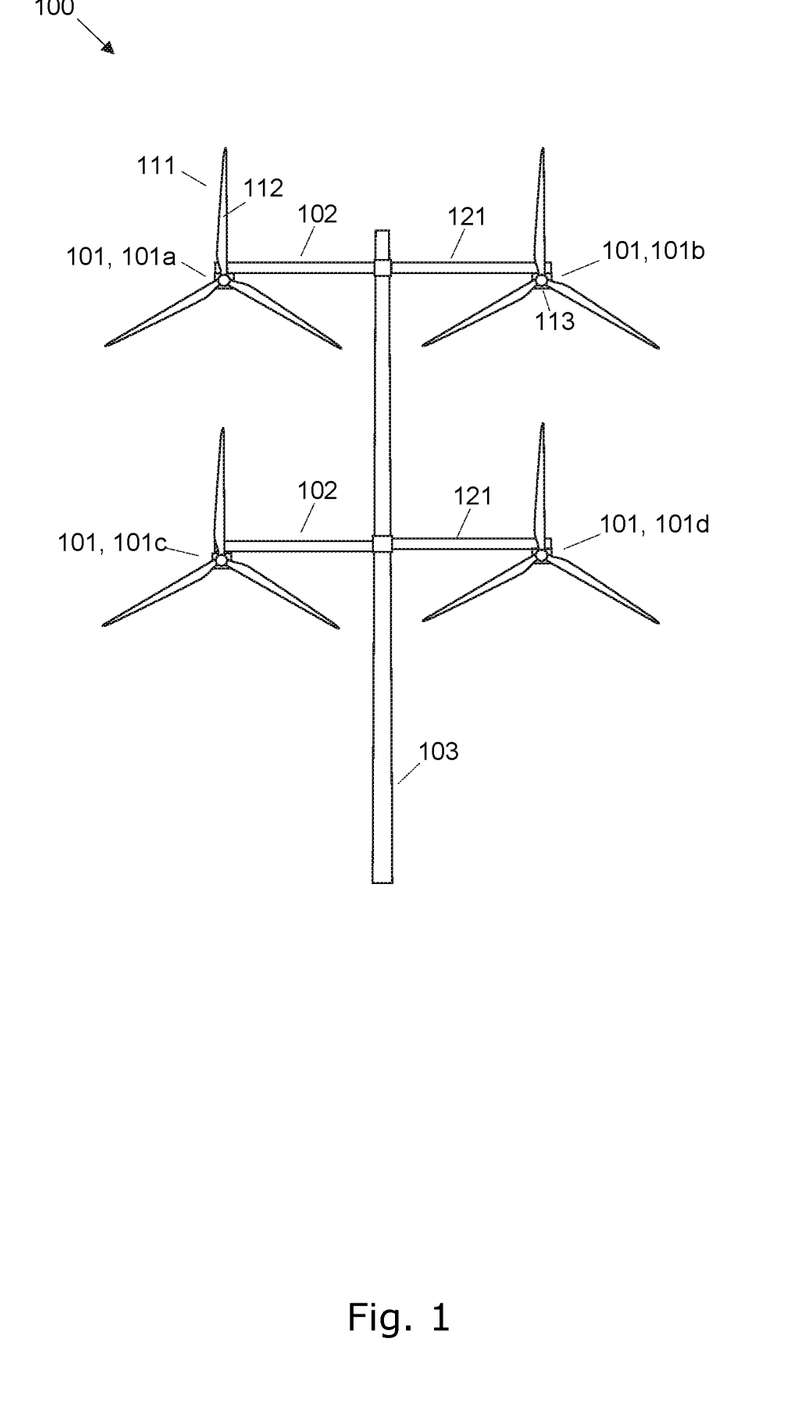
FIG. 1 shows a wind turbine system comprising four wind turbine modules.

FIG. 1 shows a wind turbine system 100 which comprises a plurality of wind turbine modules 101 mounted to a common support structure 102. The common support structure may be configured in various ways, but is generally arranged to enable mounting of at least some wind turbine modules 101 away from the tower 103 and on opposite sides of the tower 103. For example, the common support structure 102 may be in the form of one or more beam structures 121 extending outwardly from the tower 103, e.g. from opposite sides of the tower 103.

Each of the wind turbine modules 101 comprises a rotor 111, a power generation system (not shown) driven by the rotor and a rotor blade pitch adjustment system (not shown) for pitching rotor blades 112. The power generation system and the pitch adjustment system may be included in nacelles 113 of the respective wind turbine modules 101.

According to the embodiment in FIG. 1, each of the plurality of wind turbines modules 101 are mounted on an end part of a corresponding beam structure 121, though other positions on the beam structures are possible, particularly when more than one wind turbine module is mounted on an a single beam structure or a part of a beam structure 121 extending in a given direction from the tower 103.

Specifically, FIG. 1 shows a support structure 102 with two beam structures 121 each carrying two wind turbine modules 101, but other embodiments are of course conceivable, e.g., four beam structures 121 with four wind turbine modules each or three beam structures with lower, middle and upper beam structures, respectively having six, four and two wind turbine modules.

The plurality of wind turbine modules carried by the support structure 102 may be in the same vertical plane, or they may be shifted relative to each other. In the wind turbine modules 101, the kinetic energy of the wind is converted into electrical energy by a power generation system (not shown), as it will be readily understood by a person skilled in wind turbines.

Individual wind turbine modules 101 are referred to as the first to fourth wind turbine modules 101a-101d.

The power generation system is controllable to produce a power corresponding to a power reference by adjusting the pitch of the rotor blades 112 or by controlling a power converter to adjust the power production.

The pitch adjustment system may be configured to control the rotor blades 112 of a given rotor 111 by individual pitch adjustments of each rotor blade or by a common pitch adjustment of all rotor blades.

Figure 2A:
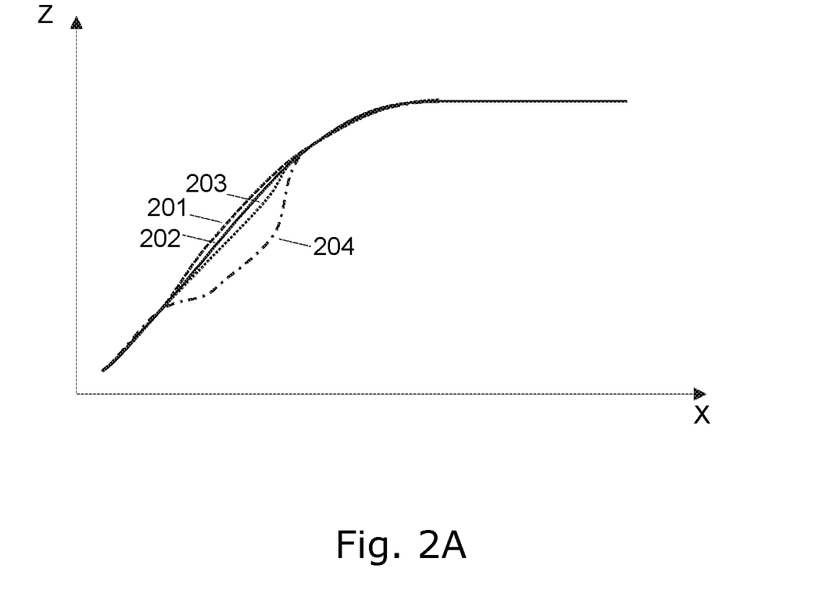
FIG. 2A shows parameters obtained for each of the wind turbine modules of the wind turbine system.

FIG. 2A illustrates an embodiment of the invention where values Z of parameters 201-204 have been obtained for each of the wind turbine modules 100 of a wind turbine system 100. Here the parameters 201-204 are represented by curves as a function of a variable X, but the parameters could be represented in other ways. The curves of the parameters 201-204 are possibly shown exaggerated. For example, the parameters 201-204 may have been obtained from the respective wind turbine modules 101 in FIG. 1. The parameters may have been obtained by measurements, estimations, extraction of control or process parameters of the wind turbine modules 101 and by other ways. The parameters relate to the operation of the wind turbine module for which the parameter is obtained. For example, the parameters may be performance parameters relating to the performance of the respective wind turbine modules 101. For example the performance parameters may relate to the power production performance, pitch system performance, structural load performance, frequency of fault alarms performance or others.

In this example, the parameters 201-204 are shown as a function of the variable X. The variable X could be any variable on which the parameters 201-204 depend, e.g. wind speed, ambient temperature, generator temperature or other variables of the wind turbine modules 101. In an embodiment the variable X represents a time variable. However, the parameters 201-204 could also be independent parameters which do not depend on the variable X.

In the example in FIG. 2A, the curves of the parameters 201-204 are intended to illustrate power productions of each of the wind turbine modules 101. Accordingly, each parameter 201-204 is determined dependent on a power production of the wind turbine module 101 for which the parameter is obtained. It is noted that embodiments of the invention are not limited to the example of power productions which only serve as an example. Accordingly, the curves of FIG. 2A could illustrate other parameters as well.

The curves for power production parameters have been obtained as a function of the variable X which, in this example, is a wind speed variable. Accordingly, the power production parameters have been obtained together with one or more wind speed parameters, e.g. measured wind speeds of the wind turbine system 100.

In general, the parameters 201-204 may be obtained together with the variable X, or the parameters 201-204 may otherwise be synchronized with the variable X in other ways.

FIG. 2A shows that the curves of parameters 201-203 for three of the wind turbine modules 101 are more or less identical, whereas the curve of parameter 204 for one of the wind turbine modules deviates significantly from the other curves for a part of the range of the variable X, here a range of wind speeds.

Since the wind turbine modules 101 are located close to each other—and thereby are exposed to similar environmental conditions—similar performance of the wind turbine modules 101 of a given wind turbine system 100 can be expected if the wind turbine modules 101 operate properly. In the case of traditional wind turbines, i.e. wind turbines which only has a single rotor 111, the wind turbines are separated so that similar performances cannot be expected. Accordingly, for traditional wind turbines it may be difficult to detect under-performance of a given wind turbine, whereas for wind turbine systems 100 deviation of a parameter 201-204 of one or more wind turbine modules 101 from the majority of the same parameters 201-204 of the other wind turbine modules 101 may indicate a fault, under-performance or generally incorrect performance of the one or more deviating wind turbine modules 101.

The test for determining if one or more of the wind turbine modules 101 has an incorrect performance may be performed by comparing each of the parameters 201-204 of a given wind turbine module 101 with the parameters 201-204 of the other wind turbine modules or with a comparison parameter determined from one or more of the parameters 201-204 of the wind turbine system.

For example, for a wind turbine system 100 comprising two wind turbine modules 101 the parameter 201 of one of the wind turbine modules 101 can be compared with the parameter 202 of the other wind turbine module. If a deviation between the parameters is detected this could indicated incorrect performance of one of the wind turbine modules 101.

For a wind turbine system 100 comprising three or more wind turbine modules 101 the parameter 201 of one of the wind turbine modules 101 can be compared with the parameters 202-204 of the other wind turbine modules. If the comparison of one of the parameters 201 with one or more other parameters 202-204 shows a deviation this could indicate incorrect performance of one of the wind turbine modules 101. If comparisons show that a first parameter 201 deviates from at least two other parameters 202-204 (e.g. a second and a third parameter), this indicates incorrect performance of one of the wind turbine modules 101 and that the incorrect performance is most likely caused by the first wind turbine module 101. That is, since the parameter of the first wind turbine module 101 deviates from at least two other modules, it is most likely the first wind turbine module that has a problem.

Alternatively, instead of comparing each parameter 201-204 with each other parameter 201-204, a comparison parameter determined from one or more of the parameters 201-204 may be used as a basis for determining a deviating parameter.

Figure 2B:
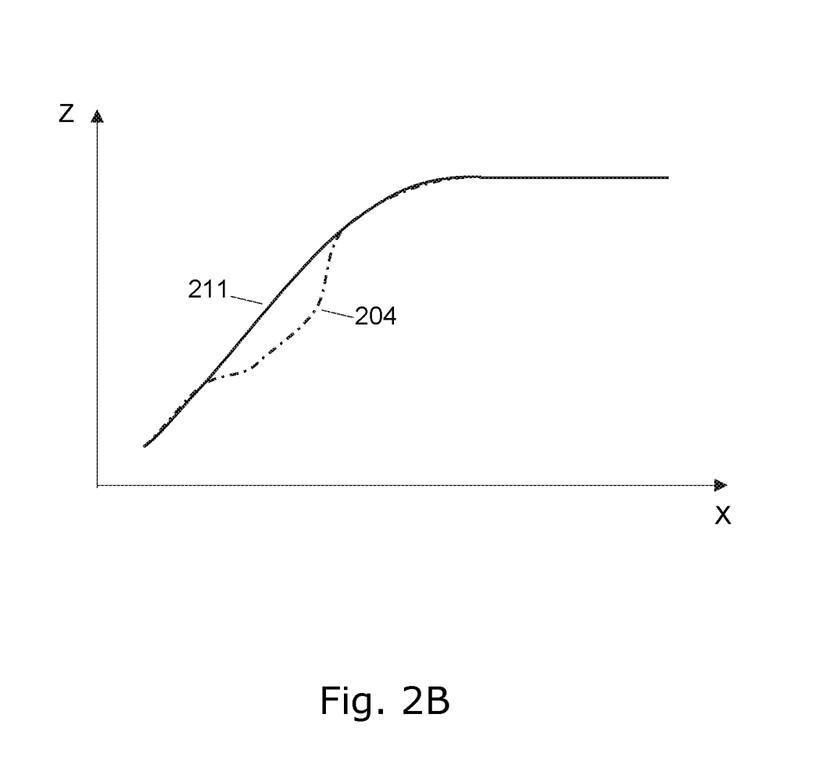
FIG. 2B shows a parameter for one wind turbine module and a comparison parameter determined from one or more parameters.

FIG. 2B shows the curve of the parameter 204 and the curve of a comparison parameter 211 determined from one or more of the parameters 201-204.

The comparison parameter 211 may have been obtained as an average of all parameters 201-204 of the wind turbine system 100, e.g. by averaging the values Z of the parameters 201-204 for all values, specific values or ranges of the variable X.

Alternatively, the comparison parameter 211 may be determined as the median of the parameters 201-204 or the average of a selection of the parameters which excludes the greatest and smallest values of the parameters 201-204. For example, for different values or ranges of the variable X, the median of the parameters 201-204 or average of a selection of the parameters 201-204 could be determined to form the comparision parameter 211.

The comparison parameter 211 could also be based on a selection of the parameters 201-204, e.g. parameters for a pair of wind turbine modules located at the same height. In general, the comparison parameter 211 can be determined based on one or more of the parameters 201-204. In an example, the comparison parameter 211 is the same as one of the parameters 201-204, e.g. in the case where each parameter is compared with each other parameter.

In case the comparison parameter 211 is based on at least two of the parameters 201-204, the comparison of a parameter 201 with the comparison parameter may comprise comparing the parameter for a first one of the wind turbine modules 101 with the comparison parameter 211, where the comparison parameter is based on at least two of the parameters 201-204 obtained for at least two of the wind turbine modules other than the first wind turbine module, and invoking the performance action for the first wind turbine module if the result of the comparison satisfies a predetermined criterion, e.g. if the deviation satisfies a given threshold. Thus, in this case, if there is a difference it is most likely the first module that has a problem.

It is understood that the step of comparing the parameter 201-204 for one of the wind turbine modules with a comparison parameter 211 may be performed by comparing the values Z of the parameters 201-204 for different values or ranges of the variable X or may be performed independent of the variable X, e.g. by determining a value Z for each parameter 201-204 as an average over values of the variable X. As another example, the comparison may involve determination of a deviation value in the form of a mean deviation averaged over the variable X or in the form of an integral deviation obtained by integrating differences of the values Z over the variable.

The parameters 201-204 may be determined as a function of X, e.g. by integrating the values Z of a parameter 201 over intervals of the variable X so that the parameter 201 comprises one or more integration values of Z. In general, each of the parameters 201-204 may be constituted by one or more values or by a graph or curve comprising values Z or values obtained based on values Z and where the each parameter depends on the variable X or is independent of the variable X.

Dependent on the result of the comparison of a parameter 201-204 for one of the wind turbine modules 101 with a comparison parameter 211 an action may be invoked. For example, if the comparison shows a deviation, e.g. a deviation value, between the one of the parameters 201-204 and the comparison parameter 211 which exceeds a given threshold, incorrect performance may be assumed, and a performance action is invoked. The performance action may involve performing tests, e.g. for the purpose of checking the presence of assumed faults associated with the parameters 201-204 leading to the deviation. Additionally or alternatively, the performance action may involve an action for removing the cause of the incorrect performance or bring the wind turbine system 100 into a safe operational mode, e.g. for the purpose of preventing damages or wear due to the detected fault.

Due to wind shear or other effects, the wind turbine modules 101 located at different heights above ground may be exposed to different wind speeds.

In order to compensate the parameters of the wind turbine modules 101 mounted at different heights for a dependency on different wind speeds at the different heights, the parameter 201-204 for each of the wind turbine modules can be obtained so that the parameters depend on wind speeds for the wind turbine modules. For example, the parameters 201-202 for the wind turbine modules 101a, 101b having the same height at the top can be obtained so that the parameters depend on a wind speed or wind speed parameter which is common for those wind turbine modules 101a, 101b. The parameters 203-204 for the lower wind turbine modules 101c, 101d can be determined so that they depend on a wind speed which is common for those modules.

For example, the curves for parameters 201-202 can be obtained as a function of a wind speed variable X1 which represent the wind speed at the height of the first and second wind turbine modules 101a, 101b. Similarly, the curves for parameters 203-204 can be obtained as a function of another wind speed variable X2 which represent the wind speed at the height of the third and fourth wind turbine modules 101c, 101d.

Accordingly, the parameter 201-204 for each of the wind turbine modules 101 may be obtained so that each parameter depends on a wind speed parameter relating to the wind speed at the wind turbine module for which the parameter is determined. For example, the wind speed parameter may be determined as a common wind speed parameter for all wind turbine modules mounted at the same or substantially the same height.

For example, the common wind speed parameter X2 for the lower third and fourth wind turbine modules 101c, 101d may be determined as an average of wind speeds v3 and v4 for the third and fourth wind turbine modules: X2=(v3+v4)/2. Similarly, the common wind speed parameter X1 for the upper first and second wind turbine modules 101a, 101b may be determined as an average of wind speeds v1 and v2 for the first and second wind turbine modules: X1=(v1+v2)/2.

Accordingly, by determining the parameters so that they depend on the wind speed as described above, the parameters become comparable since the dependency on heights of the wind turbine modules has been compensated.

Each of the parameters may be determined dependent on a history of values obtained over a period, preferable a longer period such as a period of at least one hour. For example, values Z of the parameters 201-204 may be obtained as an average of value Z over a period.

According to an embodiment—e.g. where the parameters 201-204 represent power productions of the wind turbine modules 101a-101d—the performance action to be started in response to detected parameter deviation may comprise obtaining wind speeds of one or more of the wind turbine modules 101 for the purpose of finding an incorrect wind speed. For example, the wind speeds used for controlling the wind turbine modules (in case wind speed is used for controlling) mounted at the same or substantially the same height, e.g. wind speeds for the first and second wind turbine modules 101a, 101b, may be obtained and compared. If the obtained wind speeds for the wind turbine modules 101 at the same height are too different, e.g. if the difference of average wind speeds exceeds a given threshold, it can be assumed that one of the obtained wind speeds are incorrect. A deviation like 204 can be caused by wrong wind signals.

An example of a type of deviations 204 which directly impact the performance includes deviations caused due to one turbine operating in a unintended mode—e.g. de-rated due to high component temperatures which indicates a system fault. Another example includes deviations caused by blade problems such as blade contamination, ice formation, blade-damage, leading edge erosion, blade add-ons that were torn of, etc. In this case further automated or manual actions can be taken to determine which of the wind speeds are incorrect and to correct the fault.

Alternatively—e.g. in an embodiment where the parameters 201-204 represent power productions—the performance action may comprise obtaining pitch positions of the blades 112 of at least two wind turbine modules 101 for the purpose of finding incorrect pitch angles, e.g. low pitch angles at high wind speeds. For example, pitch positions of the blades 112 may be obtained and compared to detect a possible deviation between pitch values for different wind turbine modules 101, e.g. wind turbine modules 101 located at the same height or different heights. If pitch angles for wind turbine modules located at different heights are compared, the comparison may be comprise use of wind speeds for the different heights, e.g. by use of the wind shear compensation described above. The reason for a possible difference in wind speeds may be due to contaminated or damaged blades which will cause low pitch angles at high wind speeds.

Other performance actions in case of detected deviation between any type of parameters 201-204 may comprise automated verification of software or software version in one or more of the wind turbine modules 101.

Figure 3:
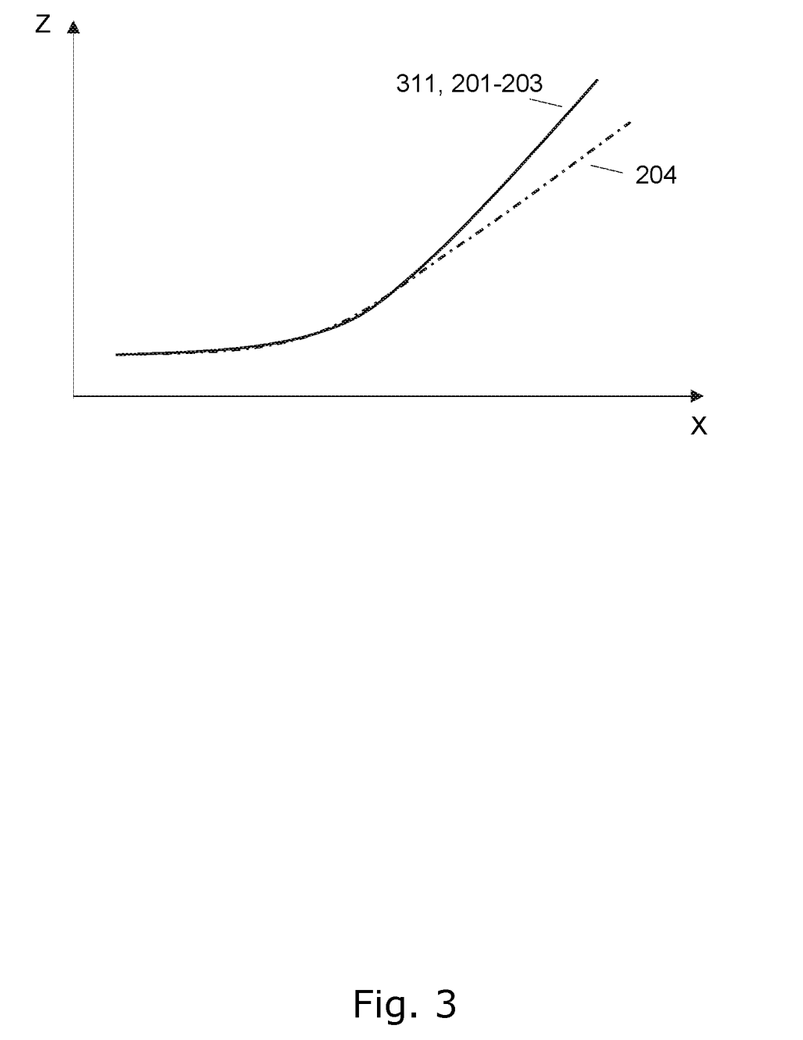
FIG. 3 shows parameters relating to a pitch activity of the blades of the wind turbine modules.

FIG. 3 shows an example where the curves of the parameters 201-204 are intended to illustrate pitch activity of the blades 112 of each of the wind turbine modules 101. The pitch activity quantifies the activity of the blades, e.g. the amplitude and/or frequency of pitch adjustments over time. For example, each of the parameters 201-204 could be obtained as an accumulated pitch distance for the respective wind turbine modules 101, e.g. by calculating the integral of the pitch adjustment amplitudes over time. The integral of the pitch adjustment amplitudes may be binned according to wind speed valid for the respective wind turbine module 101, i.e. by calculating the integral for different ranges of the wind speed, e.g. for difference ranges of the of the variable X.

The parameters 201-204 representing pitch activity (or other activity) may be compensated for presence of different wind speeds the different heights as explained above (for the example of parameters representing produced power) by binning the parameters 201-202 according to the wind speed variable X1 representing the wind speed at the height of the first and second wind turbine modules 101a, 101b. Similarly, the parameters 203-204 can be binned according to the wind speed variable X2 representing the wind speed at the height of the third and fourth wind turbine modules 101c, 101d.

In FIG. 3 the curves of the parameters 201-202 are determined and plotted dependent on the wind speed variable X1, whereas the parameters 203-204 are determined and plotted dependent on the wind speed variable X2 along the common variable X. Since each of parameters 201-204 are determined dependent on a wind speed X1, X2 valid for the respective wind turbine module from which the parameter has been obtained the parameters are comparable.

FIG. 3 shows the curve representing the pitch activity parameter 204 and the curve 311 of a comparison parameter 311 determined from one or more of the pitch activity parameters 201-204. Comparison of the parameter 204 with the comparison parameter 311 shows a deviation, i.e. a deviation exceeding a predefined threshold, for relative high wind speeds X.

Due to the parameter deviation, a performance action may be invoked for the purpose of handling the problem associated with the deviation.

For example, the performance action may comprise performing a pitch test for at least two of the wind turbine modules 101, e.g. a pitch test that quantifies how well the pitch system follows a pitch reference such as a sinusoidal pitch reference. Accordingly, the pitch test may comprise determining a difference between an applied pitch reference and a measured pitch position of the blades for each of the at least two of the wind turbine modules, e.g. at least two of the wind turbine modules mounted at the same or substantially the same height. The applied pitch references may be in-phase and identical so that the performance of the wind turbine modules can be compared. After the pitch test has been performed, the integrated difference between the pitch reference and the pitch position determined for the respective wind turbine modules may be compared. If one of the wind turbine modules 101 has an associated integrated difference which deviates from the integrated differences of one or more of the other wind turbine modules a pitch problem can be assumed.

In an other example, the pitch test is performed by applying the pitch reference such as a sinusoidal pitch reference to one of the wind turbine modules 101 while accelerantions such as blade accelerations are measured at all wind turbine modules 101. Problems with the wind turbine system 100 could be detectable from the accelerations, e.g. problems with wire supports of the tower 103, ice formations, and other problems which affect the structural dynamics of the wind tyrbine system 100. Accordingly, eigenfrequencies, transferfunctions or other quantities determined from the measured accelerations—which may have been excited e.g. via a sinusoidal pitch reference—can be used for testing dynamical performance and associated problems.

The pitch problem may be due to an unstable full load controller, incorrect software version, wear that prevents the pitch system to follow the reference, contaminated or damaged blades 112 or other issues.

Other reasons for pitch problems may be a mal-functioning individual blade pitch controller, high tilt-yaw control activity because one of the wind turbine modules 101 has not been aligned correctly up against the wind during installation or because blade moment sensors have not been calibrated correctly or are mal-functioning for any reason.

The performance action as well as any further actions initiated after a completed performance action can automatically be checked by the control system and information can be sent to the performance center.

According to another example, the parameters 201-204 may be determined dependent on an acceleration of the wind turbine module 101 for which the parameter is obtained. For example, each parameter 201-204 may be determined as a standard deviation, maximum acceleration amplitudes and/or minimum acceleration amplitudes based on acceleration values of the respective wind turbine modules. The parameters indicating the acceleration of the wind turbine modules may be determined dependent on a wind speed for the respective wind turbine module as described above in order to compensate for different wind speeds, e.g. by determining the parameters according to different wind speed variables X1, X2 representing the wind speed at the different heights.

A significant difference of parameters 201-204 representing module accelerations may be due to mass imbalance of a rotor 111, blade pitch misalignment, wrong control parameters which makes the controller marginally unstable, a fault in the sensor system (e.g. generator speed sensor fault) that feeds the controller with input signals and, therefore, makes the controller react unintentionally.

According to other examples, each of the parameters 201-204 may be determined dependent on an a blade load of the blades 112 of the wind turbine module 101 for which the parameter is obtained, dependent on a generator speed of the wind turbine module 101 for which the parameter is obtained or dependent on other performance related parameters of the wind turbine modules 101.

According to another example, each parameter 201-204 is determined dependent on a number of alarms generated by the wind turbine module 101 for which the parameter is obtained. The alarms may relate to various operational conditions of the wind turbine modules, such temperature, vibrations and other conditions. A significant deviation of the number of alarms from one wind turbine module 101a to another may indicate a problem. For example, a higher number of alarms may be due to false alarms because of mal-functioning sensor systems. For example, a generator bearing temperature sensor may be wrongly adjusted or misplaced.

Another example could be a pitch deviation alarm—i.e. if a pitch deviation to an applied reference occurs more frequent on one turbine this could be a sign of beginning wear-out on one or more of the blade bearings. A performance action could be generated in case one wind turbine module generates significant more alarms than another wind turbine module. The performance action could be in the form of an early warning issued to a performance center so that a service team can schedule inspection and/or replacement of certain components.

Figure 4A:
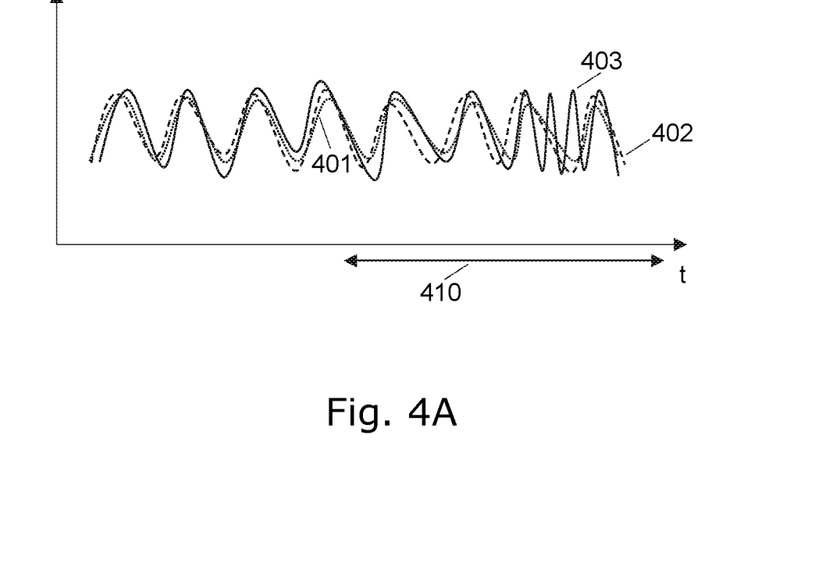
FIG. 4A and FIG. 4B show examples of the time-varying signals used for determining parameters for fast fault detection.
Figure 4B:
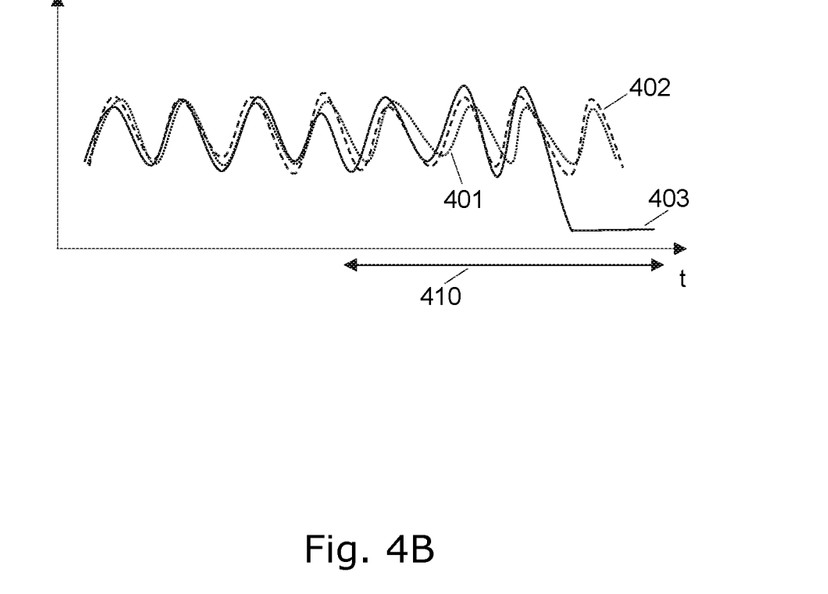

FIGS. 4A and 4B illustrate a method for performing fast fault diagnostics based on time-varying signals 401-403 obtained from the respective wind turbine modules 101, i.e. each time-varying signal is obtained from a single wind turbine module 101 of the wind turbine system 100. The time-varying signals 401-403 relate to the operation of the wind turbine. For example, the time-varying signals 401-403 could be pitch angles of the blades 112, power generated by each wind turbine module 101, wind speed obtained for each wind turbine module 101, temperature signals for a given component of each wind turbine module 101, hydraulic pressure of hydraulic systems, and others. Each parameter 201-204 for a given wind turbine module 101 is obtained from the time-varying signal from that wind turbine module. For example, the parameter for each wind turbine module may be based on its respective time-varying signal contained within a time-window 410 containing the most recent part of the time-varying signal, e.g. a length of at most one hour.

FIG. 4A shows that the time-varying signals 401-403 are similar in the first part of the signals (the oldest data), but in the last part of the signals within the window 410, signal 403 starts oscillating with a frequency which is significantly higher than the other signals, e.g. due to a controller instability. By determining the parameters 201-204 so that they indicates the frequency content of the time-varying signals 401-403, e.g. by performing FFT analysis, a comparison of the parameters 201-204 would show that one of the signals 401-403 deviates from the other signals. Accordingly, a problem with one of the wind turbine modules 101 may be assumed, and a performance action may be initiated.

FIG. 4B similarly shows that one of the signals 401-403 suddenly changes to a constant value which again could be detected as a deviation between parameters 201-204 determined from the signals 401-403.

The comparison of the time-varying signals 401-403 could be performed based statistical calculations based on the signals. For example, the comparison could be based the mean value, the standard deviation, and maximum/minimum values of each of the signals 401-403. One or more of the statistical results for each of the signals 401-403 may be averaged to form the comparison parameter 211, 311 and the comparison parameter can compared with the statistical results for each of the signals to check if a significant deviation is present.

Before a possible a performance action is initiated if the comparison shows a significant deviation, a check of other conditions of the wind turbine system 100 may be performed. Such conditions could be a stop of a wind turbine module 101 due to some reason, wind gusts causing an increase in rotation speed or other conditions having a known or predictable cause.

In comparison with the examples described in connection with FIGS. 2A, 2B and 3 and other examples, the determination of the parameters 201-204 is performed run-time based on the most recent part of the time-varying signals 401-403, whereas some of the other examples are based on statistics of possible older data. Accordingly, use of time-varying signals 401-403 may provide a faster detection of faults.

Figure 5:
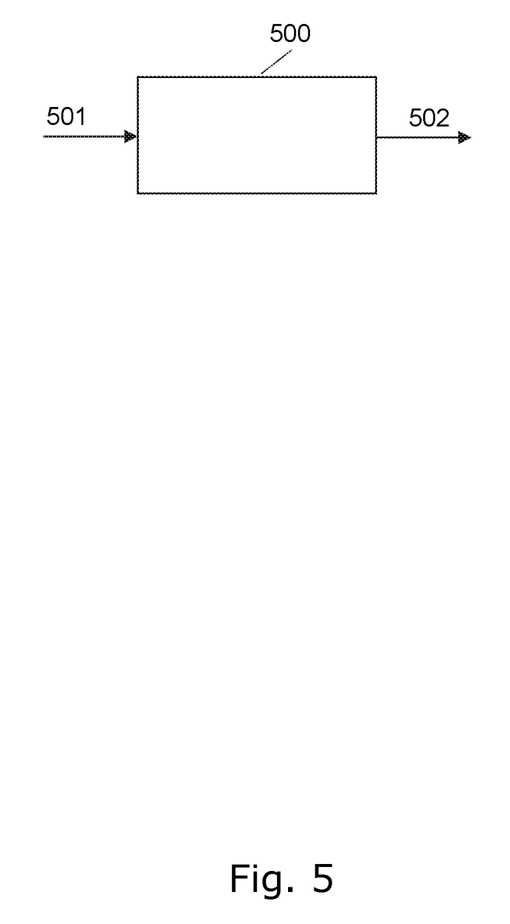
FIG. 5 shows a monitoring system arranged for monitoring performance of a wind turbine system.

FIG. 5 shows monitoring system 500 arranged for monitoring performance of a wind turbine system 100. The monitoring system, e.g. in the form of a computer or similar electronic processor, is arranged to perform the methods described in connection with FIGS. 2A, 2B, 3 and 4 and other examples. The monitoring system 500 may be arranged to received input data 501, e.g. the time-varying signals 401-403 or other data such as wind speed, power production, and other data described above for the purpose of determining the parameters 201-204. The monitoring system 500 may determine the comparison parameter 211, 311 and parameters 201-204 based on the received input data 501 and may be configured to compare the parameters with the comparison parameter. Dependent on the comparison, the monitoring system 500 may generate an output signal 502 for invoking a performance action. For example, the output signal 502 may be arranged to control systems of the wind turbine system 100 to perform a performance action or may be arranged to inform e.g. a service center about a possible detected problem with one of the wind turbine modules 101.

The monitoring system 500 may be comprised by the wind turbine system 100 or the monitoring system may be an external system located outside a wind turbine system.

In summary, the invention relates to a method for monitoring performance of a multi-rotor wind turbine. According to the method parameter for each of the wind turbine modules of the multi-rotor wind turbine is obtained. The parameters of each of the wind turbine modules are compared, e.g. by means of a comparison parameter determined from the individual parameters. Dependent on the result of the comparison, a performance action is initiated, e.g. for the purpose of further characterization or verification of a deviating parameter determined via the comparison.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for monitoring performance of a wind turbine system, the wind turbine system comprises a plurality of wind turbine modules mounted to a common support structure, wherein each of the wind turbine modules comprises a rotor, a power generation system driven by the rotor, and a rotor blade pitch adjustment system for pitching rotor blades, the method comprising:
    determining an operating parameter of each wind turbine module of the plurality of wind turbine modules;
    determining a comparison parameter based on at least the operating parameters of a first and second wind turbine module of the plurality of wind turbine modules; and
    upon determining that a difference between the comparison parameter and the operating parameter of at least one of the plurality of wind turbine modules exceeds a predefined threshold, performing a performance action.

2. A method of claim 1, wherein the comparison parameter is based on the operating parameter of each of the wind turbine modules of the plurality of wind turbine modules.

3. A method of claim 1, wherein the comparison parameter is determined based on the operating parameters of subset of the plurality of wind turbine modules.

4. A method of claim 1, wherein the comparison parameter is determined based on the operating parameter of each of the wind turbine modules of the plurality of wind turbine modules, excluding the operating parameter of a wind turbine module to which the comparison parameter is compared.

5. A method of claim 1, wherein the operating parameter of the first wind turbine module and the operating parameter of a wind turbine module to which the comparison parameter is compared are different operating parameters.

6. A method of claim 1, wherein the comparison parameter is a function of the operating parameters of the first and second wind turbine modules.

7. A method of claim 1, wherein the operating parameter of each wind turbine module of the wind turbine modules is a function of a wind speed at the respective wind turbine module that indicates different heights or positions of the respective wind turbine modules on the common support structure.

8. A method of claim 1, wherein each operating parameter is determined based on a history of operating parameter values of its respective wind turbine module.

9. A method of claim 1, wherein each operating parameter is determined based on a power production of its respective wind turbine module.

10. A method of claim 1, wherein the performance action comprises determining wind speeds at wind turbine modules at a same height on the common support structure.

11. A method of claim 1, wherein the performance action comprises determining pitch positions of the rotor blades of at least two wind turbine modules of the plurality of wind turbine modules.

12. A method of claim 1, wherein each operating parameter is a function of a pitch activity of the rotor blades of its respective wind turbine module.

13. A method of claim 12, wherein the performance action comprises performing a pitch test for at least two of the wind turbine modules of the plurality of wind turbine modules, wherein the pitch test comprises determining a difference between an applied pitch reference and a measured pitch position of the rotor blades of each of the at least two of the wind turbine modules.

14. A method of claim 13, wherein the pitch test comprises applying in-phase oscillating pitch references to at least two of the wind turbine modules of the plurality of wind turbine modules at a same height on the common support structure.

15. A method of claim 1, wherein each operating parameter is determined based on an acceleration of its respective wind turbine module.

16. A method of claim 1, wherein each operating parameter is determined based on a blade load of the rotor blades of its respective wind turbine module or a generator speed of its respective wind turbine module.

17. A method of claim 1, wherein each operating parameter is determined dependent on a number of alarms generated by its respective wind turbine module.

18. A method of claim 1, further comprising:
    determining the operating parameter of each wind turbine module of the plurality of wind turbine modules as a function of time; and determining the difference between the comparison parameter and the operating parameter of each wind turbine module of the plurality of wind turbine modules based on a time window applied to the function of time.

19. A method of claim 18, wherein the time-window comprises a maximum time period of one hour.

20. A wind turbine system, comprising:
- a plurality of wind turbine modules mounted to a common support structure, wherein each of the wind turbine modules comprises a rotor, a power generation system driven by the rotor, and a rotor blade pitch adjustment system for pitching rotor blades; and
- a monitoring system configured to perform an operation, comprising:
    - determining an operating parameter of each wind turbine module of the plurality of wind turbine modules,
    - determining a comparison parameter based on at least the operating parameters of a first and second wind turbine module of the plurality of wind turbine modules, and
    - upon determining that a difference between the comparison parameter and the operating parameter of at least one of the plurality of wind turbine modules exceeds a predefined threshold, performing a performance action.

* * * * *